United States Patent [19]

Croslin et al.

[11] Patent Number: 5,737,319
[45] Date of Patent: Apr. 7, 1998

[54] DYNAMIC NETWORK TOPOLOGY DETERMINATION

[75] Inventors: William D. Croslin, Colorado Springs, Colo.; Mark W. Sees; Perry Voyles, both of Plano, Tex.

[73] Assignee: MCI Corporation, Washington, D.C.

[21] Appl. No.: 632,200

[22] Filed: Apr. 15, 1996

[51] Int. Cl.⁶ ........................................................ G06F 13/00
[52] U.S. Cl. ........................ 370/255; 370/254; 395/200.5; 395/200.53; 395/185.01
[58] Field of Search ............................ 395/200.5, 200.51, 395/200.52, 200.53, 200.54; 370/254, 255

[56] References Cited

U.S. PATENT DOCUMENTS

| | | | |
|---|---|---|---|
| 5,051,987 | 9/1991 | Conlon | 370/255 |
| 5,483,522 | 1/1996 | Derby et al. | 370/400 |
| 5,506,838 | 4/1996 | Flanagan | 370/258 |
| 5,657,320 | 8/1997 | Russ et al. | 370/217 |

OTHER PUBLICATIONS

Coan et al., "Using Distributed Topology Update and Pre-planned Configurations to Achieve Trunk Network Survivability", IEEE Transactions on Reliability, Oct. 1991., pp.: 404–416, 427.

Rutenburg et al., "How to Extract Maximum Information from Event-Driven Topology Updates", INFOCOM '93, 1993, pp.: 1004–1013.

Yehsakul et al., "A Topology-Based Algorithm for Tracking Network Connectivity", IEEE Transactions on Power Systems; Feb. 1995, pp.: 339–346.

Antonakopoulos et al., "A Distributed Information Network for Quality Control in a Factory Environment of Production and Distribution of Sensitive Products", Factory 2000—Advanced Factory Automation, Oct. 1994, pp.: 586–592.

*Primary Examiner*—Alyssa H. Bowler
*Assistant Examiner*—Walter D. Davis

[57] ABSTRACT

A system and method for dynamically determining the physical connection topology between diverse network elements (DNEs) within a communication network. Each DNE is audited on a periodic basis to determine the arrangement, configuration, cross-connection, and alarm status of each communication port within each DNE in the communications network. A topology database is maintained with such baseline information. Each DNE is configured with at least one mismatched port. Mismatched ports are cross-connected with communication ports within DNEs so that signal mismatch alarms are generated by communication ports coupled with the mismatched ports in other DNEs. Signal mismatch alarms are collected and processed so that connectivity status may be derived based on the baseline data, expected alarms, and the receipt of such alarms or lack thereof. A topology database is continuously updated to reflect such derived information.

18 Claims, 8 Drawing Sheets

DYNAMIC NETWORK TOPOLOGY DETERMINATION

BACKGROUND OF THE INVENTION

1. Field of the Invention

The present invention relates generally to telecommunications and more particularly to the dynamic determination of the physical topology of a telecommunications network.

2. Related Art

Large communications networks comprise a multiplicity of diverse network elements. One class of such network elements may be described as transmission carrying elements. Transmission carrying elements comprise various means and methods for transporting diverse types of information from one location to another within the communications network. Transmission carrying elements include transmission lines such as copper wire pairs, coaxial cables and optical fiber cables. They also include wireless communication means such as microwave radio point to point and satellite transmissions. The various types of information that are transported via the transmission carrying elements include voice, video, computer and other forms of data packaged in a variety of formats.

The transmission carrying elements are composed of segments that are interconnected by another class of network elements that may be referred to as switching elements. Switching elements serve to connect transmission segments together to form communication circuits, and to direct traffic to particular destinations within the network. Additionally, switching elements are used to recover from system outages that occur due to network malfunctions, high traffic conditions, and the like, by re-directing traffic to alternate transmission segments that are reserved for such use. Redundant transmission segments are generally connected to the switching elements so that alternate routing segments are available when needed, thereby increasing the overall capacity of the communications network.

Current network capacity is constantly in a state of flux, especially in large communication networks. Changes to network capacity occur for example, following expansions and/or reorganizations of network equipment. Updates, enhancements and other changes to existing network equipment may also affect the network capacity. In addition, network outages caused by malfunctions and high traffic conditions, instantly and without warning, reduce network capacity. Information relating to the state of a network's capacity at a particular instant in time is referred to as the network topology.

Many network processes and operations depend on the current and accurate portrayal of the network topology. For some applications, information relating to the real-time physical topology of the network is critical. Dynamic network restoral is an example of one such application. As the name implies, the purpose of dynamic network restoral is to quickly and dynamically restore network communications in the event of an network outage. For example, if a transmission segment suddenly becomes severed, a dynamic network restoral application directs the switching element to select one of the alternate transmission segments to replace the severed one. Ideally, the restoration occurs with sufficient speed so that the affected transmissions will continue without disconnecting. Dynamic network restoral processes require a timely and accurate portrayal of the network topology at the instant such unexpected network outages occur. Thus, data related to the current network topology must be continuously updated and maintained.

Conventionally network topology databases are manually maintained. Such databases generally contain a initial or optimal view of the connectivity state of the network. Typically, such databases are programmed with information pertaining to the capacity of the network without regard for network outages. They are subsequently updated whenever changes to the network are intentionally implemented. For example, if new transmission cables are added or removed from the network, the topology databases are updated to reflect those changes to the network capacity.

Many problems exist with this conventional method. First, there is no assurance that such information is entered in a timely manner. Therefore, the conventional topology databases do not necessarily reflect the connectivity state of the network at any given instant in time. Second, conventional databases do not reflect changes that occur to the network outside of the regular planned network activities, as described above. Equipment failures, network outages, power failures, and other unplanned changes that affect the network are not reported by such conventional topology databases.

Therefore there is a great need for a real-time topology database that reflects the true physical connectivity state of the network at any given instant in time. While such databases could be used for many purposes, they are especially adaptable for use with dynamic network restoral procedures. Typically two methods are used to restore network capacity in the event of catastrophic network outages. The first method may be called static restoration, and the second, dynamic restoration.

Static restoration methods use predefined alternate routes to circumvent outages caused by failed components. Unfortunately, due to the natural flux in the network, as previously described herein, such predefined alternate routes may not be available when needed due to additional system outages not reported by conventional topology databases. Consequently, without real-time network topology information, such static restoration techniques may not be reliable.

Dynamic restoration techniques do not rely on pre-defined alternate routes, but instead select the best alternate route at the time the system outages occur. Dynamic restoration techniques are desirable due to this increased flexibility in handling network fluctuations in real time. However, dynamic routing techniques depend even more heavily on the availability of timely and accurate network topology information than static restoral techniques.

SUMMARY OF THE INVENTION

Accordingly, the present invention provides a method and system for dynamically determining the real-time physical network connectivity of network capacity between diverse network equipment elements. The present invention provides data that defines a baseline capacity for diverse network elements within a communications network. This baseline topology is continuously updated to reflect the current state of the network's connectivity. The present invention exercises each element of network capacity so as to determine the real-time physical connectivity between the diverse network elements. A network topology database is maintained and frequently updated to reflect the current real-time physical connectivity of the communications network.

Features and Advantages

A feature of the present invention is that it provides real-time network topology that reflects the current connectivity state of the network at any given instant in time.

An advantage of the present invention is that it provides real-time, current network topology information to static restoration processes so that such processes can determine whether pre-defined alternate routes are available.

A further advantage of the present invention is that it provides real-time, current network topology information to dynamic restoration processes so that such processes can determine the best alternate routing path available when system outages occur.

Additionally, the present invention provides other telecommunication processes with a means for determining the current real-time topology of the communications network.

Further features and advantages of the invention, as well as the structure and operation of various embodiments of the invention, are described in detail below with reference to the accompanying drawings.

BRIEF DESCRIPTION OF THE FIGURES

The present invention will be described with reference to the accompanying drawings, wherein.

In the drawings, like reference numbers generally indicate identical, functionally similar, and/or structurally similar elements. The drawing in which an element first appears is indicated by the leftmost digit(s) in the reference number.

DETAILED DESCRIPTION OF THE PREFERRED EMBODIMENTS

Figure 1:
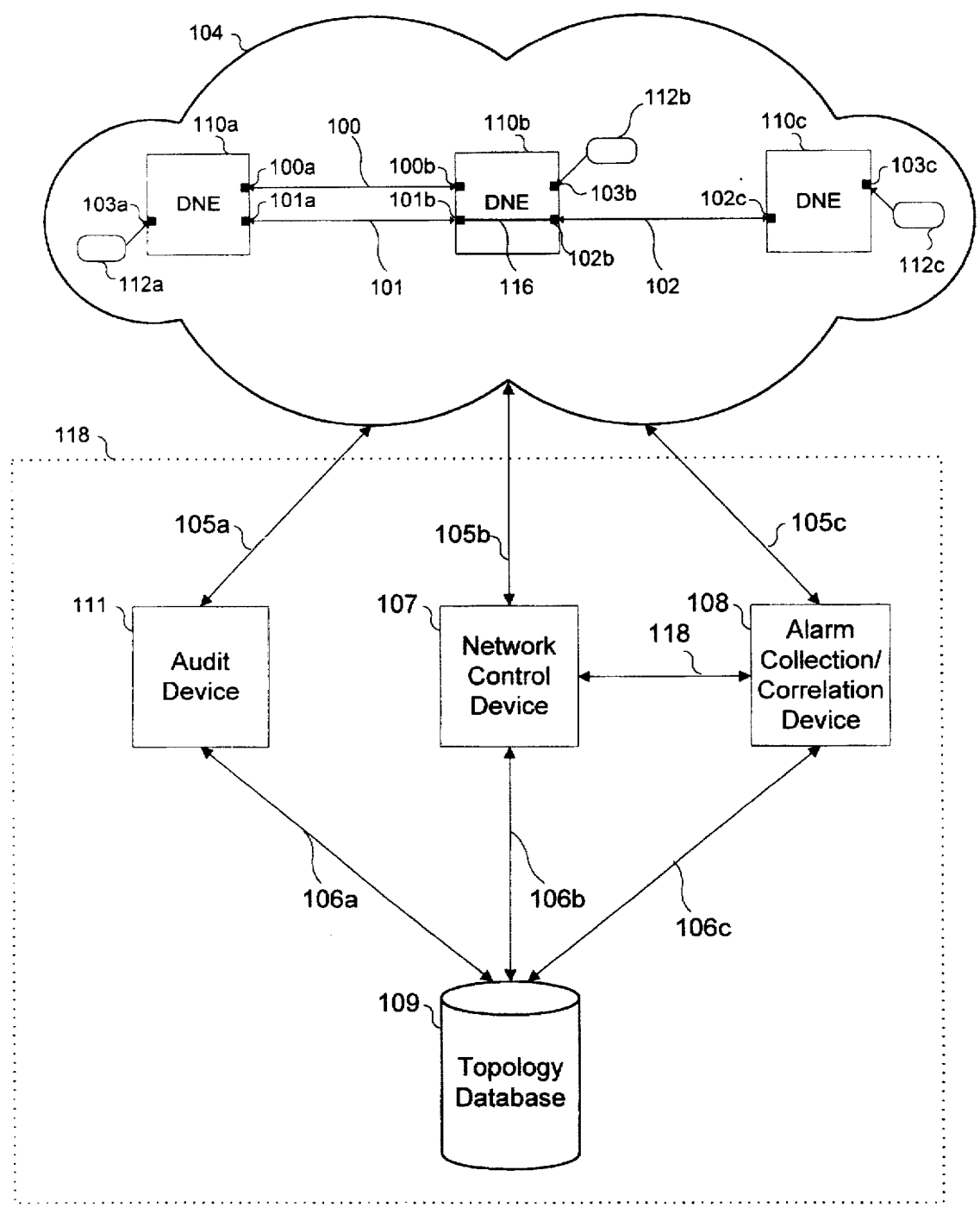
FIGS. 1 and 8 block diagrams showing the operative environment according to embodiments of the present invention.

FIG. 1 depicts a network 104 comprising diverse network elements (DNEs), as shown by DNE 110a, DNE 110b and DNE 110c (generally DNE(s) 110). DNEs 110 are connected to each other by capacity lines or 'segments', such as segment 101 that connects DNE 110a to DNE 110b. Each segment, such as segment 101, is connected to a specific DNE, such as DNE 110a, through a 'port', such as port 101a.

Each port in each DNE is distinctly configured to transmit and receive signals of a specific type and/or format. In order to transmit and receive signals through the network 104 via the DNEs 110, network capacity (or segments, such as segments 101 and 102 for example), are connected together through a DNE (DNE 110b for example). This is accomplished by electronically 'cross-connecting' two ports together within the same DNE, as shown by cross-connection 116 within DNE 110b. The cross-connection 116 joins two different segments together, segment 101 and segment 102, and creates network capacity which passes through the DNE 110b.

The joined network capacity formed by segments 101, cross-connect 116, and segment 102, is referred to as a 'trunk'. A trunk, as discussed herein, may consist of a single segment, such as segment 101, or more than one segment which are coupled together via cross-connections within one or more DNEs 110, as previously described. Each end of each trunk terminates at a non-cross-connected (or 'open') port within a different DNE 110. For example two trunks are shown in FIG. 1 The first trunk is formed by the segment 100. Trunk 100 has one end terminating at the open port 100a in DNE 110a, and a second end terminating at the open port 100b at DNE 110b.

The second trunk is formed by the segment 101, the cross-connect 116, and the segment 102. This trunk has one end terminating at open port 101a in DNE 110a, and a second end terminating at open port 102c in DNE 110c. The definition of a trunk at a single point in time, depends upon the current cross-connections within the various DNEs 110. For example, if cross-connect 116, were connected between ports 100b and 102b, a trunk would be formed that consists of the segment 100, the new cross-connect 116, and the segment 102.

Note that the Network 104 depicted by FIG. 1 is a simplified view of a communications network. This simplified view is presented to facilitate the instant description in order to distinctly point out the principles of the present invention. As depicted in FIG. 1, the two trunks just described are each terminated at open ports within the network 104. Consequently these trunks are not presently being used to transport active communications traffic within the network 104. Typically, trunks arranged in this manner may be classified as redundant capacity being reserved for use in the event of system outages that occur in the active communication channels (not shown). As stated, the present invention is particularly adaptable for use with dynamic restoral procedures that rely on the use of such redundant capacity in the event of system outages. As such, FIG. 1, depicts such redundant capacity trunks.

Continuing now, with a detailed description of the elements in FIG. 1, each port (such as port 100a) has the ability to send out unsolicited notifications referred to herein as an 'alarm'. Alarms are transmitted via the network 104, by a port, such as port 100a, whenever the port detects a particular pre-defined type of event or failure. For example, alarms are generated by the ports, such as port 100a, in the event that the format or type of signal received by the port, does not match the format or type of signal configured for the port, as previously described. For example, if port 100a receives a signal from port 100b that is different in format from the signal configuration for the port 100a, a signal mismatch alarm is generated by port 100a.

Each DNE 110 has two sides which may be described as a transmitting side and a receiving side, the designation of which depends upon the direction of the flow of communications being described at the time. Likewise, each port such as port 100a, performs both transmit and receive operations. Therefore, each port may be described as either a transmitting port or a receiving port. The designation of a particular port also depends upon the direction of the flow of communications being described at the time.

For example, if communications are flowing in the direction from the DNE 110a to the DNE 110b, port 100a will be described herein as a transmitting (or sending) port which is coupled to the transmitting side of DNE 110a. The port 100b will be described herein as receiving port which is coupled to the receiving side of DNE 110b. If the flow of communications were reversed, port 100b will be described as a transmitting (or sending) port on the transmitting side of DNE 110b, while port 100a will be described as a receiving port on the receiving side of DNE 110a.

A signal connection between two ports, such as ports 101b and 102b, within the same or 'local' DNE 110, is referred to herein as a cross-connection, such as the cross-connection 116, within the local DNE 110b. A signal connection between two ports, such as ports 100a and 100b, where such ports reside in different DNEs 110, is referred to herein as a connection between 'remote' DNEs. Connections between ports in remote DNEs are accomplished with segments, such as the connection between ports 100a and 100b, via the segment 101.

Ports within a DNE which are not cross-connected are referred to herein as 'open' ports, such as open port 100b. Ports within a DNE that are currently cross-connected with a port on the opposite side of the DNE, is referred to herein as cross-connected ports, such as cross-connected ports 101b and 102b.

If a signal transmitted by one port, such as port 101a, does not match the format and/or type of signal configured for the receiving port (hereinafter referred to as a 'mismatched signal'), such as port 101b, a signal mismatch occurs within the receiving port 101b. In addition to the previously described signal mismatch, a signal mismatch 'alarm' is generated by the receiving port 101b. In this case, a signal mismatch alarm is generated by the receiving port 101b because the mismatched signal originates from a sending port (101a) in a remote DNE (DNE 110a), via the segment 101.

Conversely, ports that are cross-connected with ports within a local DNE 110, do not generate such signal mismatch alarms in response to signal mismatches received from the port on the opposite side of the DNE. For example, cross-connected port 102b does not generate a signal mismatch alarm in response to a mismatched signal from port 101b, via the cross-connect 116 within the local DNE 110b. To put it another way, signal mismatch alarms are only generated by receiving ports coupled to the receiving side of a DNE, in response to the receipt of a mismatched signal that originates from a remote DNE, via a transmission segment (such as segment 101).

Therefore, using the example above, if a signal transmitted by port 101a does not match the configuration for ports 101b and 102b, (and such ports are cross-connected by cross-connect 116), a signal mismatch occurs within ports 101b and 102b, but only port 101b generates a signal mismatch alarm. As stated, ports that receive mismatched signals originating from remote DNEs generate signal mismatch alarms, and ports that receive mismatched signals from within cross-connected local DNEs do not generate signal mismatch alarms.

Thus, if port 101a transmits a signal that is a mismatch for ports 101b, 102b, and 102c, only ports 101b and 102c will generate alarms for the trunk that is defined by the segment 101, the cross-connect 116, and the segment 102. The present invention uses these characteristic signal mismatches and signal mismatch alarm generation rules to determine the current network topology, as described below.

Referring back now to FIG. 1, mismatched signal generators 112a, 112b, and 112c (generally 112) are coupled to ports 103a, 103b and 103c (generally 103), respectively. A mismatched signal generator is a signal generation device adapted to transmit a mismatched signal into the network 104. Such mismatched signals are transmitted in order to induce alarms within the various receiving ports that receive such signals. The alarms are used to determine the current real-time connectivity between the DNEs 110 in the network 104, as will be described in the following example.

Note that the signal generators 112 as described herein, may be internal or external to the DNE ports, depending on the specific embodiment and implementation of the present invention. In some cases the DNE ports themselves will contain signal generators which may be configured to cause the mismatch signal alarms according to the principles of the present invention. In other cases, external signal generators can be used to generate the mismatched signal alarms as described herein.

Suppose a mismatched signal supplied by the signal generator 112a is transmitted over the network 104. This is accomplished by cross-connecting port 103a with the port 101a. Further, suppose that the actual topology at the time of this cross-connection is as depicted by the network 104 in FIG. 1. As previously described, the mismatched signal injected into the network 104 by this cross-connection, will induce mismatch signal alarms in the receiving ports 101b and 102c. The present invention uses the detection of such alarms to determine the connectivity between the DNEs 110. In this example, the detection of mismatch signal alarms from ports 101b and 102c enables the present invention to determine that connectivity exists between these receiving ports and other DNEs 110 within the network 104.

For example, the detection of the induced alarm from receiving port 101b necessarily indicates connectivity between the receiving port 101b and its associated sending port 101a. To put it another way, the detection of the induced alarm from the receiving port 101b demonstrates the existence of the transmission segment 101. Note that if segment 101 did not exist (i.e. disconnected, or out of service), at the time of the preceding cross-connection, port 101b would not receive the injected mismatched signal and thus not generate a mismatch alarm.

However, the detection of the induced mismatch alarm is conclusive evidence of the existence and good working order of segment 101. Likewise, the detection of a signal mismatch alarm from port 102c necessarily indicates the existence of segment 102. The present invention updates the current real-time topology database to report the existence of the segment 101 and the segment 102 connections.

In another example, the present invention can be used to verify a purported network topology and/or determine discrepancies between a purported network topology and the real-time current topology determined by the present invention. In this example, the purported network topology may be supplied by a conventional topology database or the like, as previously described. Again using the example above, ports 103a and 101a are cross-connected. Based on the purported topology depicted in FIG. 1, induced mismatch alarms are expected from the receiving ports 101b and 102c. However, suppose that in response to the cross-connection, an induced alarm is detected from port 101b, but no alarm is detected from port 102c. The lack of a signal mismatch alarm from port 102c is used to determine that a either a problem exists within the segment 102, or the actual topology differs from the purported topology.

In order to describe an implementation of the present invention, the following assumptions are made with respect to FIG. 1. The ports 103a, 103b and 103c are each configured with signal generation devices 112, as previously described. The signal generation devices 112 are each configured to generate a mismatched signal in order to induce signal mismatches within any of the other ports (100a, 101a, 100b, 101b, 102b, and 102c) in the network 104, that receive the mismatched signal. Thus, the ports 103a, 103b and 103c are intentionally adapted to generate signal mismatches when connected to the other ports in the network 104. Ports 103a, 103b and 103c are referred to herein as 'mismatched ports'. The other ports within the network 104 (ports 100a, 101a, 101b, 102b and 102c), are simply referred to as communication ports.

Further, connectivity is assumed to exist between the DNEs 110 and a computer system 118. The computer system 118 comprises several devices including an audit device 111, a network control device 107, an alarm collection and correlation device 108, and a topology database 109. Each of these devices will be described in detail below. The configuration and organization of the various elements that comprise the computer system 118 as described herein, are presented as an example only. Many other variations and arrangements are possible and the examples presented herein should not be construed as a limitation of the present invention.

The transmission links 105a, 105b, and 105c (generally 105), provide the means for the flow of information between the DNEs 110 and the computer system 118. The DNEs 110 depicted in FIG. 1 may be implemented with various types of well known and publicly available network switching elements, such as digital cross connects or the like. The computer system 118 may be implemented with a variety of types of well known and publicly available computer equipment, such as personal workstations, mid-range computers or large mainframes. One such example is a VAX mid-range computer system manufactured by Digital Equipment Corporation. Likewise, a variety of well known and publicly available communication protocols may be used to maintain communications between the computer system 118 and the network 104. One such well known example is the X.25 protocol. The selection of computer systems, switching elements, and/or communication protocols used to implement specific embodiments of the present invention will be apparent to persons skilled in the relevant art(s).

The transmission links 105 are used to communicate between the computer system 118 and the DNEs 110. The functions provided by each element in the computer system 118 are briefly summarized below followed by a more detailed description of each functional element.

The audit device 111 functions to obtain baseline cross-connect and current alarm status from each of the DNEs 110 in the network 104. Such information is used to update the topology database 109. The network control device 107 issues commands to cross-connect and disconnect various cross-connections, such as cross-connection 116, within the various DNEs 110 in the network 104. Each cross-connection couples a mismatched port, such as mismatched port 103a, to a communication port, such as communications port 100a. Such cross-connections are established in order to induce signal mismatch alarms throughout the network 104.

The alarm collection and correlation device 108, collects such alarms from the various ports within the network 104. The alarm collection and correlation device 108, correlates the alarms collected with information received from the network control device 107, regarding the current cross-connection. The topology database 109 is updated to reflect the current connectivity of the network 104, based on the analysis and interpretation of the preceding data, regarding baseline status, current cross-connect status, and signal mismatch alarm data. These functions will now be described in greater detail.

The functional descriptions below are examples of specific embodiments of the present invention. These examples are presented in order to fully describe the present invention so as to enable any person skilled in the art to make and use the invention. In addition to the procedures presented below, many other variations are possible without departing from the principles of the present invention. Thus, the examples presented below should not be construed to limit the scope of the present invention.

Audit Device

The audit device 111 functions to obtain baseline cross-connect and alarm information from each of the DNEs 110, within the network 104, via transmission link 105a. The baseline information may be obtained on a regular pre-defined periodic basis, or by one or more pre-defined triggering events originating from the network 104. Alternatively, such information may be obtained manually by operator intervention or any other periodic basis. The frequency at which this function is performed depends upon the requirements of specific applications that use the present invention.

The baseline information described above is used to determine the connectivity state of each cross-connection, such as the cross-connection 116, within the network 104. Additionally, the baseline information includes the current alarm state of each port, such as port 101a, within the network 104. The baseline information does not include information pertaining to the connectivity between the various DNEs 110.

At a predetermined time, audit device 111 issues a baseline query, one at a time, to each of the DNEs 110 within the network 104, via transmission path 105a. In turn, each DNE 110 reports the current cross-connection and alarm states of each port to the audit device 111, via the transmission path 105A.

An example of the process that takes place within the audit device 111 will now be described with reference to FIG. 2. The process begins with step 202 where control immediately passes to step 204. In step 204, a complete list of DNEs within the network 104 is obtained from the topology database 109. A DNE list pointer is initialized so that it points to the first DNE in the list. In step 206, the audit device sends a baseline query to the DNE identified by the DNE list pointer from step 204. Next, as step 208 indicates, a response to the baseline query is received from the DNE. The response includes information pertaining the current cross-connections and the alarm status within the DNE. The topology database is updated with this information in step 210.

In step 212, the DNE list pointer is incremented so that it either points to the next DNE, or gives some indication to the audit device 111, that there are no more DNEs to be processed from the list. Based on this information, in step 214, the audit device 111 determines if there are any additional DNEs to be processed. If there are additional DNEs in the DNE list, control is passed to step 206 and steps 206–214 are repeated until all the DNEs in the list are processed. If there are no additional DNEs to be processed, the audit process ends as step 216 indicates.

Figure 2:
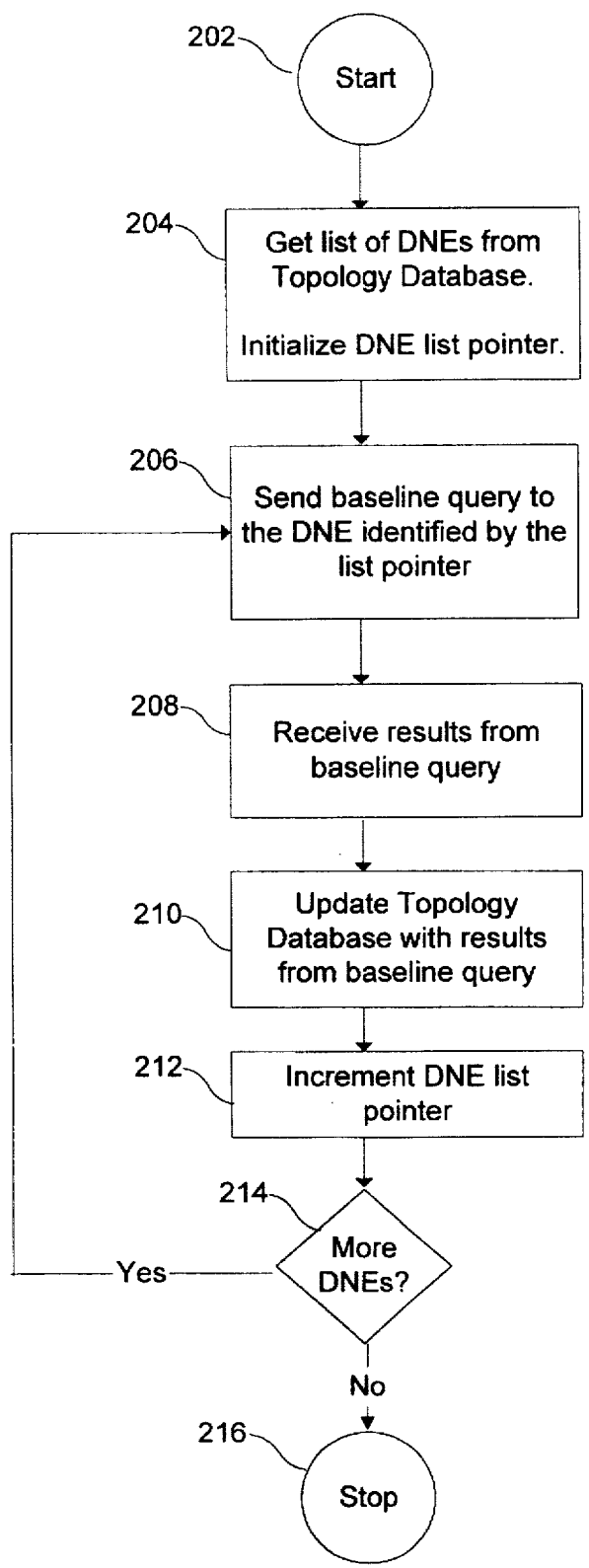
FIGS. 2–4, 6 and 7 are flowcharts depicting the preferred operation of an embodiment of the present invention.

Note that the audit process depicted by the flowchart in FIG. 2, is preferably performed on a periodic basis. This process may be repeated based on a variety of methods and/or criteria, depending on the specific implementation of the present invention. For example, the process may be repeated on a periodic basis controlled by time (e.g. every five minutes) or by some pre-defined network event, such as equipment outages or high traffic conditions.

To further illustrate the preceding process, assume that the network 104 is configured as depicted by the example in FIG. 1. Accordingly, in response to the baseline query sent by audit device 111, DNE 110b reports that cross-connection 116 currently connects port 101b to port 102b. Additionally, the current alarm states of the ports 100b, 101b, 102b and 103b, at the time of the baseline query, is reported to audit device 111.

The audit device 111 updates the topology database 109, via the transmission path 106a, to reflect the baseline cross-connect information obtained from the audit of the DNE 110b. Each of the other DNEs (DNE 110a, and DNE 110c) in the network 104 is queried in a similar manner by audit device 111. Thus, complete baseline information regarding the network 104 is obtained by audit device 111. The baseline topology is kept current by repeating this process on a periodic basis, as previously described herein.

Referring again now to FIG. 1, the following table shows the results from an audit of the network 104 by audit device 111. In the table below, 'open' indicates that a cross-connect does not exist within the DNE and 'cross-connected to XX' indicates that a cross-connection to port XX exists within the DNE. All ports in network 104 are assumed to be not in an alarm state.

In addition, the examples below follow the convention previously described herein, where all ports within network 104 are configured to transmit and receive the same format and type of signals, except for the mismatched ports 103a, 103b and 103c. Each mismatched port (103a, 103b and 103c) is adapted so that when they are connected with any communications port within the network 104, a signal mismatch is generated by the communications port.

| DNE | Port | Baseline Status |
| --- | --- | --- |
| 110a | 100a | open |
| 110a | 101a | open |
| 110a | 103a | open |
| 110b | 100b | open |
| 110b | 101b | cross-connected to 102b |
| 110b | 102b | cross-connected to 101b |
| 110b | 103b | open |
| 110c | 102c | open |
| 110c | 103c | open |

Network Control Device

The function of the network control device 107 will now be described. Network control device 107 issues commands to various DNEs 110 via transmission path 105b. Such commands direct the DNEs 110 to connect and disconnect certain cross-connections with one or more mismatched port(s) 103, so that signal mismatches occur within the network 104. Current baseline information (provided by the audit device previously described herein), is available to the network control device 107. Such information is obtained from the topology database 109, via the transmission link 106b.

An example of the process that takes place within the network control device 107, will now be described with reference to FIG. 3. The process begins with step 302 where control immediately passes to step 304. In step 304, the network control device 107 retrieves the baseline information from the topology database 109, via transmission link 106b. Additionally a list of the DNEs, including the ports within each DNE that is to be exercised according to the present invention, is retrieved. The composition of this list will depend upon the specific implementation of the present invention and will be subsequently described below. A DNE list pointer is initialized so that it points to the first DNE in the list.

In step 306, the network control device 107, issues a command to the DNE that is identified by the DNE list pointer. The command directs the DNE to cross-connect a particular mismatched port with a particular communications port within the local DNE 110, according to the principals of the present invention (described below). Upon each execution of step 306 a different communication port is connected with a mismatched port until all desired communication ports have been cross-connected in this fashion. The signal generators 112 are continuously transmitting signals during this time. Accordingly, each cross-connection performed during each execution of step 306, causes a mismatch to occur within all the communications ports coupled with the mismatched port via the network 104. In addition, such action, may or may not induce signal mismatch alarms within the network 104, depending on the current connectivity at the time each cross-connection is performed. The absence or presence of mismatch alarms is subsequently used to determine or verify current network connectivity. The techniques used to determine and/or verify current network topology will become clear as the instant disclosure develops.

The list of DNE ports that are exercised by the cross-connections in step 306, depends upon the specific use and implementation of the present invention. For example, in one implementation it may be desired to exercise only those ports within each DNE that are open, and thus currently not connected to active communication channels. Open ports, as mentioned, are typically associated with redundant capacity being reserved as alternate routes to be used by restoral processes or the like, in the event of system outages. In this case, the present invention is used to determine the actual connectivity coupled with such ports without interfering with active communications traffic.

In another embodiment of the present invention, it may be desired to exercise active communication ports which are temporarily inactive during off-peak hours or the like. In this way, the present invention is used to determine the current connectivity of communication trunks without being intrusive to current communications. For example, during times of inactivity, an active communication port is temporarily disconnected within a DNE so that the newly open port may be coupled with a mismatched port, according to the present invention. After the connectivity is determined, the communications port is re-cross-connected so that communications can proceed. During these brief disconnection periods, calls may be blocked, or alternate transmission segments may be used to route communications traffic through the DNEs that are being exercised.

In step 308, the network control device 107 sends a notification message to the alarm collection and correlation device 108. The notification message includes information about the current cross-connection from step 306. In step 310, the network control device 107 waits for a return message from the alarm collection and correlation device 108. The return message (described below), indicates to the network control device 107, that the alarm collection and correlation device 108 has completed processing for the current cross-connection from step 306.

In step 312, the network control device 107 determines whether a return message has been received. If not, the network control device 107 returns control to step 310 in order to accept a return message from the alarm collection and correlation device 108. This process continues until a return message is received, as indicated by step 314. In step 314, the network control device 107 disconnects the cross-connection made in step 306. In addition the network control device 107 clears the alarms (if any), that were generated as a result of that cross-connection. The current alarm status is determined by the network control device 107, either by examining the topology database 109, or by receiving such information from the alarm collection and correlation device 108 (in the return message from step 310, for example).

In step 316, the network control device 107 determines whether any additional cross-connections are to be conducted within the current DNE identified by the DNE list pointer. If additional communication ports are to be cross-connected with one or more mismatched port(s), control passes to step 306. Steps 306–316 are repeated for the additional cross-connection(s) until all communication ports within the DNE 110 have been cross-connected with a mismatched port in step 306.

In step 318, the DNE list pointer is incremented so that it either points to the next DNE, or gives some indication to the network control device 107, that there are no more DNEs to be processed from the list. Based on this information, in step 320, the network control device 107 determines if there are any additional DNEs to be processed. If there are additional DNEs in the DNE list, control passes to step 306 and steps 306–320 are repeated. This process continues until all the DNEs in the list are processed as described herein. If there are no additional DNEs to be processed, the network control process ends as indicated by step 322.

Figure 3:
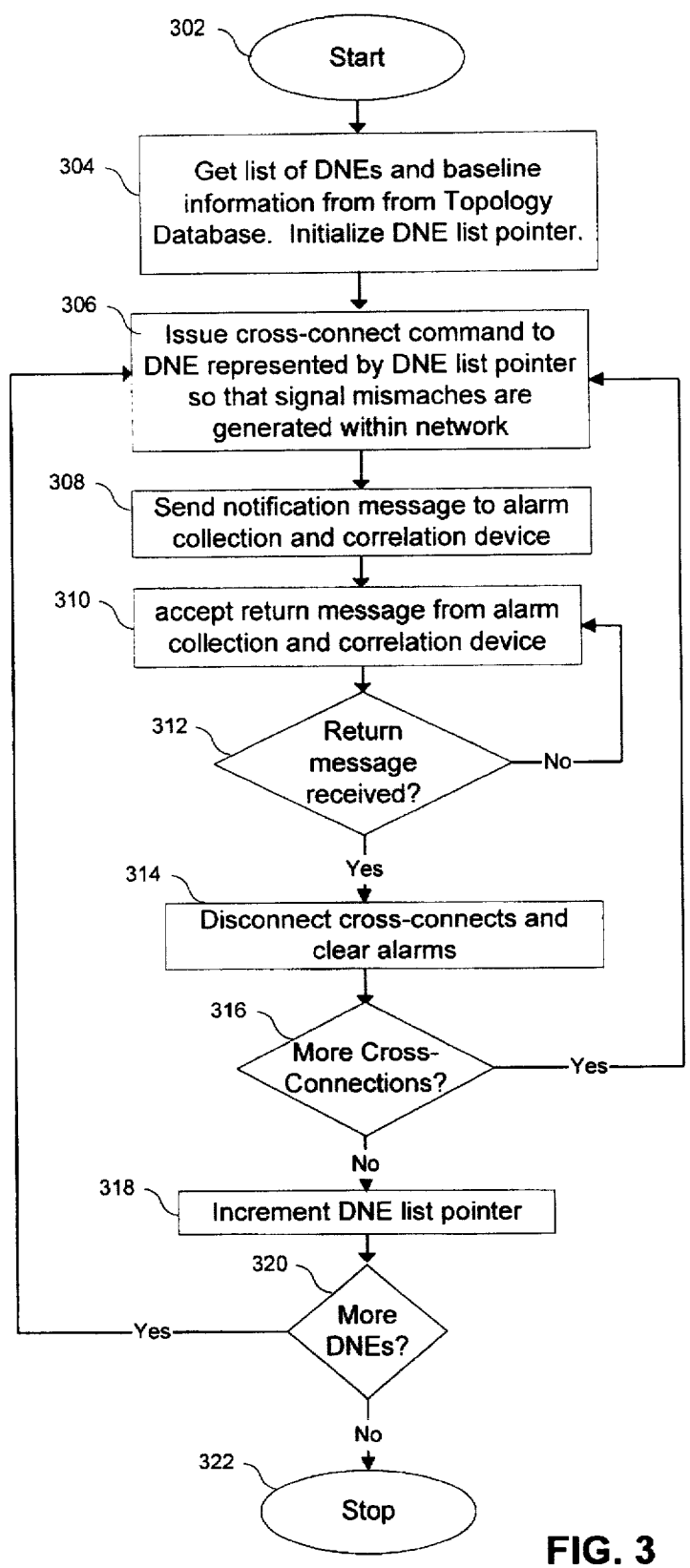

Note that the network control device process depicted by the flowchart in FIG. 3, is preferably performed on a periodic basis. This process may be repeated based on a variety of methods and/or criteria, depending on the specific implementation of the present invention. For example, the process may be repeated on a periodic basis controlled by time (e.g. every five minutes) or by some pre-defined network event, such as equipment outages or high traffic conditions.

Referring again to FIG. 1, to further illustrate the processing that occurs within the network control device 107, the following example is presented. Network control device 107 issues a command to DNE 110b, via transmission path 105b. Such command causes DNE 110b to cross-connect mismatched port 103b to communication port 100b (cross-connection not shown). This cross-connection coupled with mismatched signal generator 112b, generates a signal mismatch within port 100b.

Once this cross-connection is complete, the network control device 107 sends a notification of the cross-connection to the alarm collection and correlation device 108, via transmission path 118. The network control device 107 waits for the alarm collection and correlation device 108 to send back a return message. The return message is sent when the alarm processing (described below), related to the current cross-connection is completed. After the receipt of the return message, the network control device 107 disconnects the cross-connection between ports 103b and 100b.

In addition, the network control device 107 clears the alarms (if any) that have been generated as a result of the preceding cross-connection. Such information is provided by either the topology database or the alarm collection and correlation device 108. In this case, according to the topology depicted in FIG. 1, an alarm is generated by the receiving port 100a. Thus the alarm being generated by port 100a is cleared by the network control device 107.

The network control device 107 then proceeds in a like manner with the next cross-connection. Notification of the next cross-connection is sent to the alarm collection and correlation device 108, via transmission link 118, and the preceding process is repeated.

Alarm Collection and Correlation Device

The alarm collection and correlation device 108 receives unsolicited alarms from the network 104. This includes alarms that are not necessarily generated as a result of an implementation of the present invention. Thus, the alarm collection and correlation device 108 must distinguish between those alarms that are generated as a result of an implementation of the present invention (referred to herein as 'correlated alarms'), and those that are not. This correlation process enables the alarm collection and correlation device 108 to processes only correlated alarms according to the present invention, and ignore other alarms generated by the network 104. The details of the correlation process will be subsequently described below.

An example of the process that takes place within the alarm collection and correlation device 108 will now be described. In the example presented below a process is described that makes use of previously known connectivity information (such as information supplied by a conventional topology database or the like). This previously known connectivity information or 'purported topology', is used in an example of an alarm correlation process (described below). This particular embodiment of the present invention is presented in order to convey a clear understanding of the principles of the present invention. Another embodiment which may be a more typical example of an implementation of the present invention, will be subsequently described herein with reference to FIG. 8.

An example of the process that takes place within the alarm collection and correlation device 108 will now be described with reference to FIG. 4. The process begins with step 400 where control immediately passes to step 402. In step 402 the alarm collection and correlation device 108 waits for notification of a cross-connection from network control device 107, as previously described. Once such notification is received control passes to step 404.

In step 404, the alarm collection and correlation device 108, generates a list of anticipated alarms 408. The list of anticipated alarms 408 includes all foreseeable signal mismatch alarms that are anticipated as a result of the cross-connection performed by the network control device 107, in step 306. This list 408 is dynamically derived based on the current network topology ('purported topology') provided by the topology database 109, and the notification pertaining to the current cross-connection received from the network control device 107 in step 402. Anticipated alarms are signal mismatch alarms originating from ports on the receiving side of DNEs 110, that are directly or indirectly coupled with the port being cross-connected in step 306.

For example, suppose the alarm collection and correlation device, in step 402, receives notification of a cross-connection between mismatched port 103a and communication port 101a within the DNE 110a. Further, suppose the purported topology is as depicted in FIG. 1, including the cross-connection 116 within DNE 110b. Thus, based on the preceding notification and topology information, an anticipated alarm list 408 is generated by the alarm collection and correlation device 108. The anticipated alarm list 408 contains the receiving port 101b and the receiving port 102c.

In step 406, unsolicited alarms originating from the network 104 are monitored and collected by the alarm collection and correlation device 108. Once an alarm has been detected in step 406, the alarm data is collected by the alarm collection and correlation device 108 and control passes to step 407. Alternatively, control passes to step 407 in the event of an alarm time-out. An alarm time-out occurs after a predetermined amount of time has elapsed since the receipt of the cross-connection notification from step 402. The amount of time associated with the alarm time-out condition is an sufficient amount of time (e.g. 10 seconds), in which all induced alarms should be received by the alarm collection and correlation device 108, taking into account the longest possible delays. Thus, as step 407 indicates, if a time-out condition has been satisfied control passes to step 414.

If a time-out has not occurred, control passes to step 410. In step 410, the alarm collection and correlation device 108 determines whether the alarm collected in step 406 correlates with the notification of the cross-connection received from the network control device 107 in step 402.

The correlation process may take many forms, depending on the specific implementation of the present invention. Two general principles which are common to the many variations of the correlation processes according to the present invention are as follows. First, unsolicited alarms that are not signal mismatch alarms are immediately eliminated as possible candidates for correlated alarms. Thus, if the collected alarm is not a signal mismatch alarm, control passes from step 410 back to step 406. Second, correlated alarms must be collected before the time-out period has expired, as previously described. Thus, any alarm collected after the time-out period is not a correlated alarm.

However, signal mismatch alarms that are received in step 406 before the time-out period has expired are candidates for correlated alarms. As stated there are many possible variations of the correlation process that may be used in order to implement a specific embodiment of the present invention. The correlation process determines whether the collected signal mismatch alarm in step 406 is a result of the cross-connection from step 306.

In this case, the correlation process is as follows. In step 410 the alarm collection and correlation device 108 determines whether the alarm collected in step 402 is a correlated alarm by comparing it against the list of anticipated alarms 408, generated in step 404. If the preceding comparison indicates a match, the correlated alarm data is added to a list of correlated alarms 416. If a match is not indicated, the unsolicited alarm is not processed and control passes back to step 406 to collect another alarm. Subsequent alarms collected by alarm collection and correlation device 108 are processed in a similar manner.

As stated, this simplified correlation process which is based on a purported topology, is presented in order to distinctly point out the principals of the present invention. As will become clearer as the instant disclosure progresses, other implementations of the present invention are possible and such implementations will be apparent to those skilled in the relevant art(s). Note a practical problem exists according to this simplified correlation process as presented herein. In order to generate the list of anticipated alarms 408, prior knowledge concerning the connectivity of the network 104 (the purported topology) is assumed. However, it is this assumed information pertaining to the connectivity of the network 104 that is being sought by the present invention.

Notwithstanding the circular nature of the logic just described, this method may be used to verify a purported topology, for example, as reported by a conventional topology database. In addition this process can be used to determine whether discrepancies exist between a purported topology and the real-time physical topology determined by the present invention.

Referring back now to FIG. 4, if the received alarm is a correlated alarm, processing continues with step 412. In step 412, the correlated alarm data is added to a list of correlated alarms 416. The list of correlated alarms will be subsequently used to determine current real-time network topology, as described below.

Next, in step 414 the alarm collection and correlation device 108 determines whether processing is complete for the current cross-connection. Processing is complete for the current cross-connection when either of two conditions are satisfied. The first condition is when all of the anticipated alarms have been collected by the alarm collection and correlation device 108. In other words, if the list of correlated alarms exactly matches the list of anticipated alarms, processing is complete for the current cross-connection. The second condition that indicates that processing is complete for the current cross-connection is the alarm time-out condition, as previously described in step 407. If either of these conditions have not been satisfied, control passes back to step 406 where alarm collection continues, as previously described. If step 414 indicates that processing is complete, control passes to step 416.

In step 416, the list of anticipated alarms 408, generated in step 404 is compared against the list of correlated alarms 416, generated in step 412. A match of the anticipated alarm list 408 and the correlated alarm list indicates that the current real-time topology matches the purported topology retrieved from the topology data base 109. In this case, control passes to step 418b. If the list of anticipated alarms does not match the list of correlated alarms, then a discrepancy exists between the purported topology and the current real-time topology. In this case, control passes to step 418a. The processes depicted by steps 418a and 418b will now be described with reference to FIGS. 6 and 7 respectively.

Figure 6:
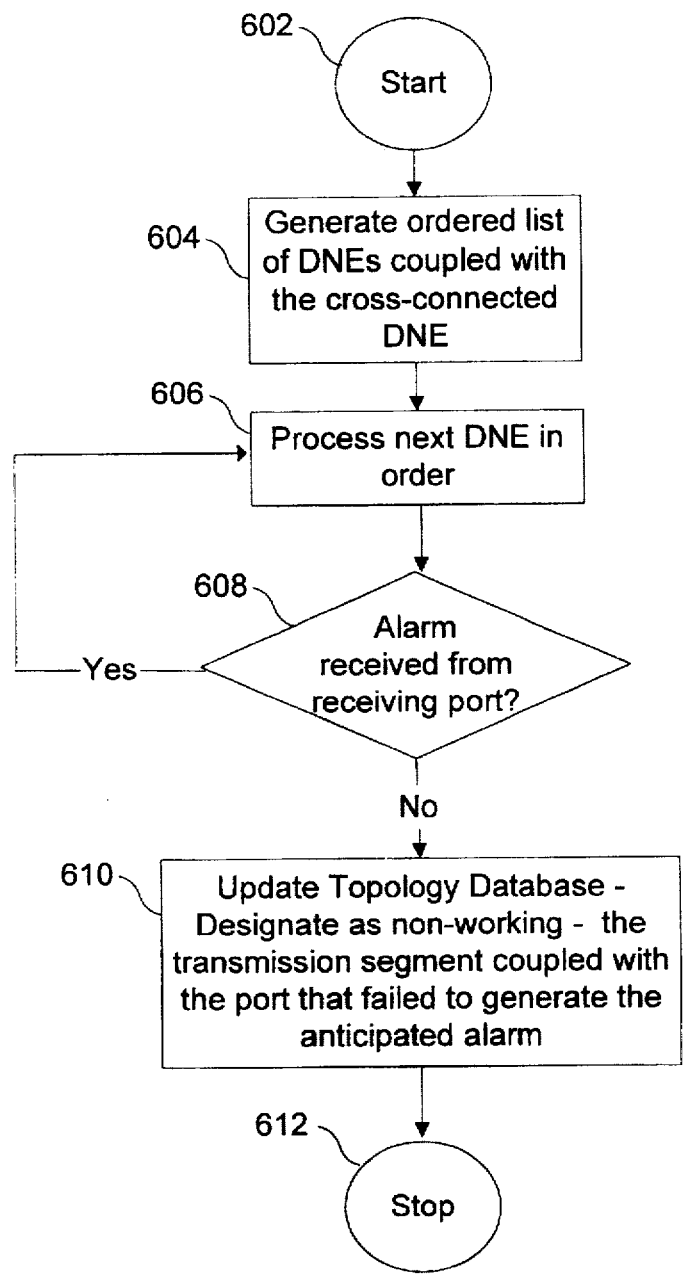

The process depicted by step 418a will now be described with reference to FIG. 6. The process that determines a discrepancy between the purported topology and the real-time topology begins with step 602, where control immediately passes to step 604. In step 604, an ordered list of DNEs is generated. The order of the DNEs begins with the first DNE that is directly connected to the sending side of the DNE that is performing the cross-connection is step 306. The next DNE is the DNE that is directly connected with the sending side of the preceding DNE. This process continues until a terminating DNE is reached. Note that in this context, 'directly connected' refers to a connection between two DNEs via a single segment, such as segment 100.

For example, if the cross-connection in step 306 is a connection between ports 103a and 101a, the ordered list of DNEs will comprise DNE 110b and DNE 110c (in that order). Note that the order depends upon the direction of the flow of the mismatched signal. In this case the signal originating from the signal generator 112a propagates across the network 104 first via DNE 110a, then via DNE 110b and finally terminates at DNE 110c.

Next as step 606 indicates, the next DNE in the ordered list is processed in step 608. In step 608, the list of correlated alarms is checked to determine whether an alarm was received from the corresponding receiving port in the current DNE that is being processed. If so, the next DNE in the list is processed in a similar manner. Finally, step 610 is processed when the first DNE in the ordered list is found not to have sent a corresponding alarm. The topology database is updated accordingly to reflect the lack of connectivity between the DNE that failed to send an alarm and its corresponding sending port.

There is no need to process any further DNEs in the ordered list of DNEs from step 604, since a break in the connectivity between the DNEs has been determined. For example, suppose the cross-connection in step 306 is a connection between ports 103a and 101a. Further suppose that no anticipated alarms have been detected. The first time step 606 is executed, the DNE 110b is processed. Since an alarm has not been detected from the DNE 110b, it is determined that the segment 101 is out of order or not connected between the ports 110a and 110b. Thus the topology database is updated to reflect this lack of connectivity. Next the process ends as step 612 indicates. As stated, it would not be useful to process the next DNE (DNE 110c in this case). The absence of the alarm from DNE 110c does not necessarily indicate a problem exists within the segment 102. As can be seen in FIG. 1, a disconnection of segment 101, would also explain the lack of the alarm data from port 102c. Thus, the actual connectivity between DNE 110b and DNE 110c will be subsequently determined when the DNE 110b and/or the DNE 110c is cross-connected, according to the processing described herein.

Figure 7:
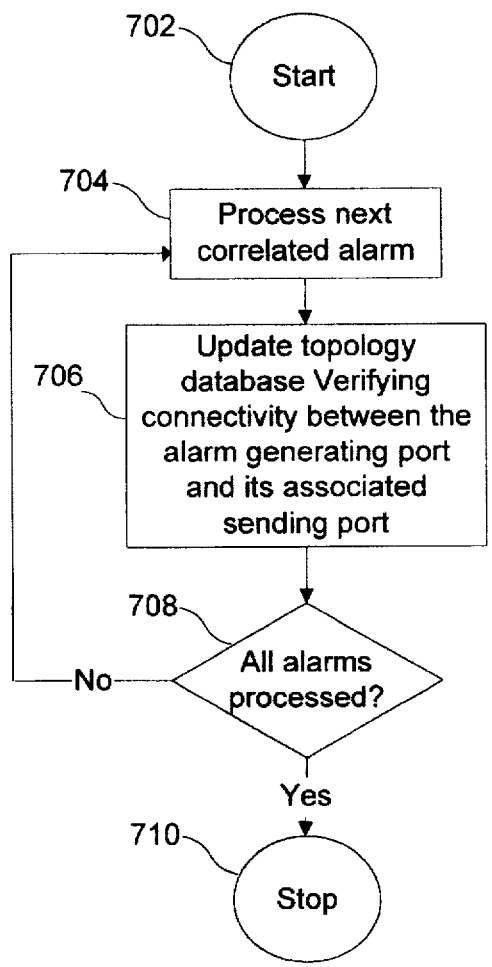

The process depicted by step 418b will now be described with reference to FIG. 7. This process indicates that the real-time topology matches the purported topology. The process begins with step 702, where control immediately passes to step 704. In step 704, the list of correlated alarms 416 that was generated in step 412 is processed. The first time step 704 is executed, the first alarm in the list is processed. In subsequent executions of step 704, subsequent alarms are processed.

In step 706, the topology database is updated to confirm the determined connectivity between the port which generated the correlated alarm, and its associated sending port. The sending port associated with the port in which generated the current correlated alarm is derived by examining data from the topology database 109.

Next, in step 708, if all alarms in the list of correlated alarms have not been processed, control passes back to step 704 and steps 704-708 are repeated until all alarms in the list of correlated alarms 416 have been processed in a similar manner as described above. Once all alarms have been processed, the process depicted by step 418b is complete as indicated by step 710.

Referring back now to FIG. 4, processing continues with step 422. In step 422, a return message is sent back to the network control device 107, indicating that processing is complete for the current cross-connection. Along with this notification, the list of correlated alarms is sent to enable the network control device 107 to clear the alarms generated by the current cross-connection. Finally, control passes back to step 402, where the alarm collection and correlation device 108 waits for the next notification from the network control device 107. When such notification is received, the process depicted by the flowchart in FIG. 4 is repeated.

Figure 4:
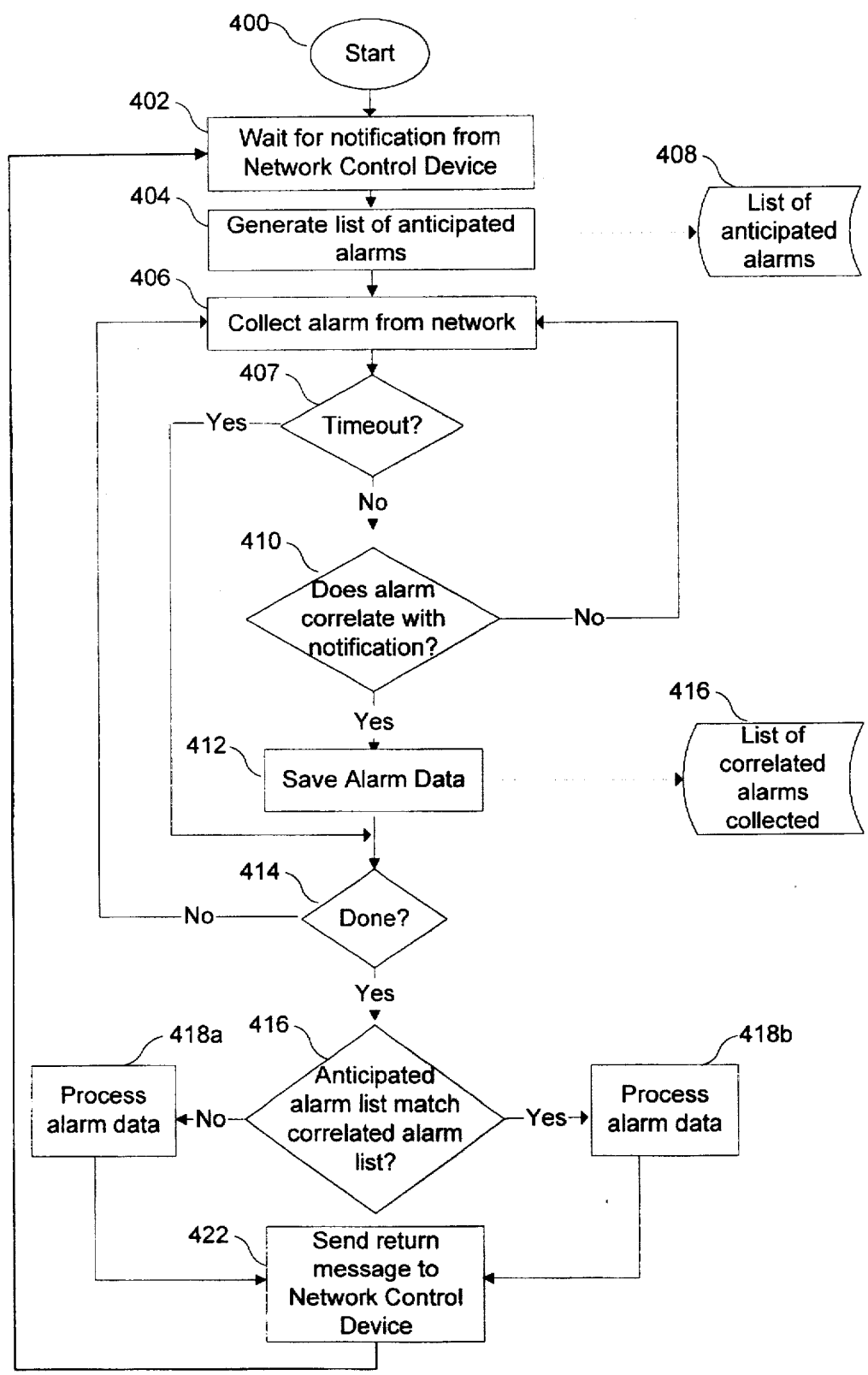

Note that like the other processes presented herein, the alarm collection and correlation device processing depicted by the flowchart in FIG. 4, is preferably performed on a periodic basis. In this example of one embodiment of the present invention the alarm collection and correlation device process is triggered by the receipt of the notification from the network control device 107, as indicated by step 402. Therefore the periodic basis in which this process is performed is associated with the periodic basis of the network control device processing previously described.

An example of the preceding alarm collection and correlation device 108 process will now be described with reference to FIG. 1. Network control device 107 issues a command to DNE 110b, via transmission link 105b, to cross-connect mismatched port 103b to communications port 100b. Notification of this cross-connection is sent to the alarm collection and correlation device 108, via transmission link 118. Next, the alarm collection and correlation device 108 receives a mismatch alarm from port 100a, as a result of the cross-connection. The alarm collection and correlation device 108 determines that this unsolicited mismatch alarm correlates to the most recent notification of a cross-connection received from the network control device 107.

Therefore, based on the correlation between the received alarm and the latest notification, the alarm collection device 108 determines that this alarm is a correlated alarm and should be processed accordingly. Armed with the alarm data from port 100a, the purported network topology data from topology database 109 (via transmission path 106c), and the most recent cross-connection notification data from the network control device 107, the alarm collection and correlation device 108 has sufficient information to determine current real-time network connectivity.

As can be seen by the topology depicted in FIG. 1, the alarm signal from port 100a, coupled with the preceding information, enables the alarm collection and correlation device 108 to determine that the transmission segment 100 is connected and is operational between ports 100a and 100b. Accordingly, the alarm collection and correlation device 108 updates the topology database 109, via transmission path 106e, to confirm that transmission segment 100 connected between ports 100a and 100b and is currently in good working order. Next, the alarm collection and correlation device 108 sends a return message to the network control device 107, via transmission path 113, indicating that the processing for the current cross-connection is complete.

Finally, the network control device 107 clears the alarm condition from the topology database 109. The network control device 107 issues a command to DNE 110b to disconnect the cross-connection of ports 103b and 100b. The network control device 107 then proceeds to the next cross-connection and the process repeats in a similar manner until information pertaining to all transmission segments within the network 104 is obtained.

Additional topology information is also derived from the absence of an expected alarm generation. Again using the example above, network control device 107, issues a command to DNE 110b to cross-connect ports 103b and 100b. Notification of this cross-connection is sent to the alarm collection and correlation device 108. However, this time alarm collection and correlation device 108 never receives the expected alarm from port 100a. After a predetermined period or time, the alarm collection and correlation device 108 times-out and determines topology data due to the fact that the anticipated alarm has not been detected. In this case, the absence of the alarm indicates that transmission segment 100 is out of order, or disconnected. Thus, the alarm collection and correlation device 108 updates the topology database 109 accordingly, and sends a return message to the network control device 107 indicating that processing is complete. Finally, the network control device 107 issues a command to DNE 110b, to disconnect the cross-connection between ports 103b and 100b. The network control device then goes on to the next cross-connection and proceeds as previously described.

Note that this is but one example of an embodiment of the present invention and many other arrangements and configurations are possible. For example, the network control device 107 may be implemented such that logic to derive network topology is contained therein. Based on the alarm information received by the alarm collection and correlation device 108, via transmission path 118, and the topology database 109, the network control device 107 can derive such connectivity information. Further, the network control device 107 may be used instead of the alarm collection and correlation device 108, to update the topology database 109 with current topology data. Similarly, the network control device 107 can be used instead of the alarm collection and correlation device 108, to 'time-out' when expected alarms are not generated within the network 104. Indeed many other arrangements are possible and as such, the examples contained herein should not be construed to limit the scope of the present invention.

Topology Database

The Topology Database 109 contains the real-time topology of the communications network 104. As described herein, the topology database 109 contains the baseline communication port cross-connect information for the various DNEs 110 received by the audit device 111. In addition the Topology Database 109 includes the real-time physical network connectivity information derived by actions of the network control device 107 an/or the alarm collection and correlation device 108, as previously described herein.

To summarize, the audit device 111, periodically updates the topology database 109 with baseline information pertaining to the DNEs 110 and their associated cross-connections (such as cross-connection 116). The network control device issues commands to DNEs 110, to cross-connect mismatch ports connected to mismatch signal generators, to communication ports, one at a time, via transmission link 105b. Notifications of each cross-connection is sent to the alarm collection and correlation device 108, via transmission link 118. The alarm collection and correlation device 108 collects and correlates unsolicited mismatch alarms from the ports within the network 104 (such as port 100a). The alarm collection and correlation device 108 derives current network topology and updates the topology database accordingly. A return message is sent back to the network control device 107, via transmission link 118. The network control device 107 clears the alarms, disconnects the cross-connects, and continues with the next cross-connection. All the preceding processes are repeated on a periodic basis.

The following table is an example of the topology database 109 and illustrates the results from an example implementation of the present invention based on the system depicted in FIG. 1. Each row in the following table begins with a cross-connection initiated by the network control device 107, to a particular DNE. The first two rows correspond to DNE 110a, the next two rows correspond to DNE 110b, and the last row corresponds to DNE 110c. The first column indicates the cross-connection made according to the principals of the present invention. The second column indicates the ports that would generate mismatch alarms based on the cross-connection in column 1. Finally, the third column indicates the network connectivity that may be derived by the present invention based on the preceding data. The topology depicted in FIG. 1 is assumed, and all transmission segments (such as segment 101) are assumed to be in good working order.

| Cross-Connection (ports) | Alarms From (ports) | Operational Topology (transmission segments) |
| --- | --- | --- |
| 103a to 100a | 100b | 100 |
| 103a to 101a | 101b, 102c | 101, 102 |
| 103b to 100b | 100a | 100 |
| 103b to 101b (cross-connection 116 disconnected) | 101a | 101 |
| 103c to 102c | 102b, 101a | 102, 101 |

The example shown above is presented for the sake of clarity, in which every possible cross-connection between mismatched ports and communication ports within the network 104 is implemented. In other implementations of the present invention, optimization methods may be employed to reduce the number of cross-connections necessary to achieve the same results. As can be seen in the table above, some of cross-connections produce the same results. For example, the cross-connection of ports 103a and 100a results in a derived connectivity of the transmission segment 100. In addition, the cross-connection of ports 103b and 100b results in the same derived topology. Since the latter cross-connection produces redundant results it can be eliminated entirely, thus increasing the efficiency of an implementation of the present invention. Such optimization can be dynamically employed for example, by the processing within the network control device 107. These and other optimization methods are well known and will be apparent to persons skilled in the relevant art(s).

Example of a Typical Embodiment

Figure 8:
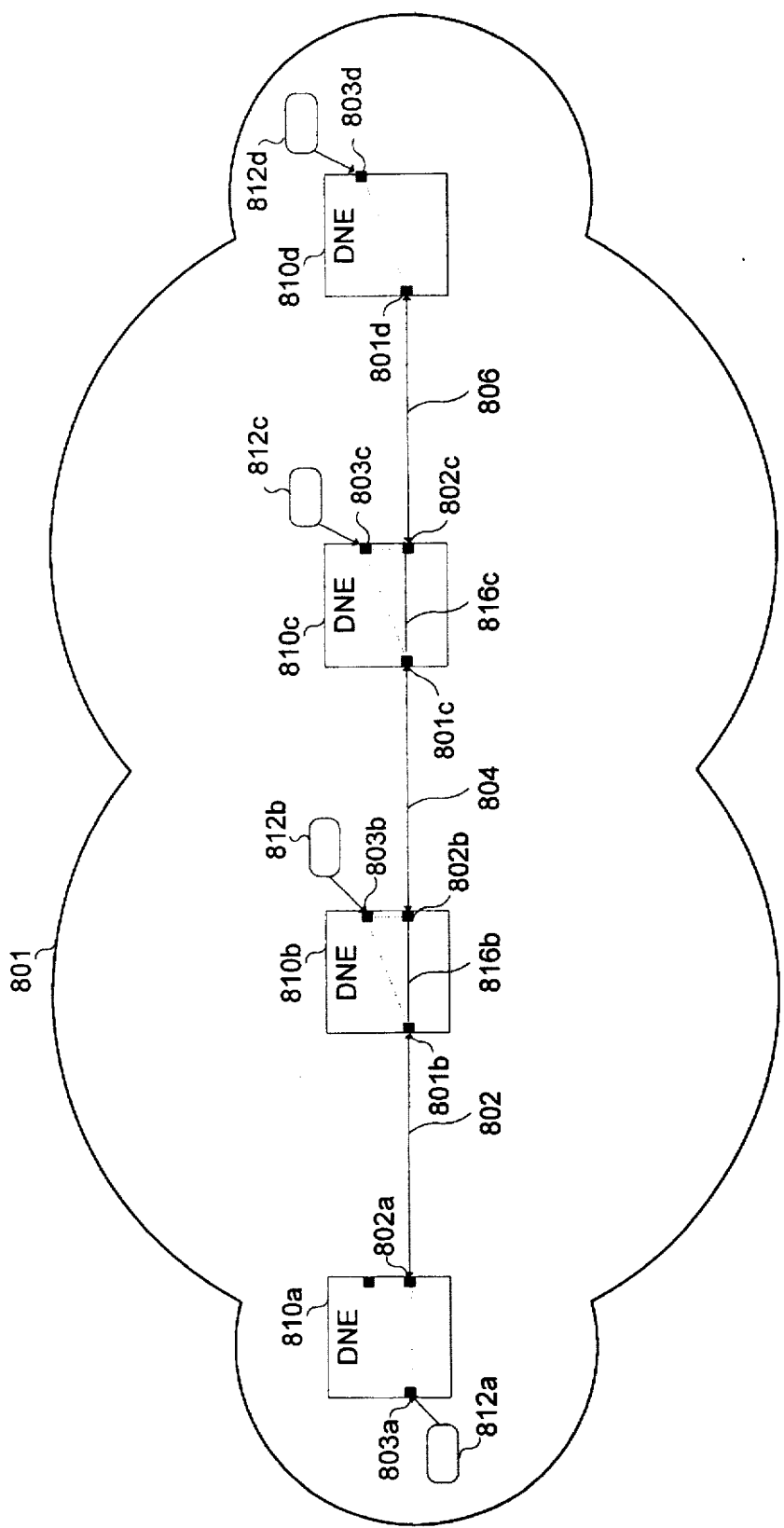

In another embodiment of the present invention, current real-time network topology is determined without relying on previous knowledge or purported network topology. Referring now to FIG. 8, a communications network 801 is shown. In this case, the network 801 consists of DNE 810a, DNE 810b, DNE 810c and DNE 810d (generally, DNE(s) 810). The DNEs depicted in FIG. 8 are similar to the DNEs depicted in FIG. 1. Likewise, the terminologies and conventions used to describe the network 104 in FIG. 1, are used in the same manner to describe the network 801 in FIG. 8.

Accordingly, mismatched signal generators 812a, 812b, 812c, and 812d are each coupled with mismatched ports 803a, 803b, 803c and 803d, respectively. Cross-connect 816b connects ports 801b and 802b within DNE 810b. Likewise cross-connect 816c connects ports 801c and 802c within DNE 810c. Finally, a trunk is shown that is formed by the segment 802, the cross-connect 816b, the segment 804, the cross-connect 816c and the segment 806. This trunk terminates at open ports 802a and 801d, within the DNE 810a and the DNE 810d respectively.

In order to describe this procedure, the following assumptions are made with respect to FIG. 8. The actual network topology is as depicted by the network 801, in FIG. 8. This includes the cross-connects 816b and 816c. The cross-connections that are depicted by dotted lines within each of the DNEs 810 are possible cross-connections that may be performed according to the principles of the present invention. These possible cross-connections (such as the cross-connection depicted by the dotted line within DNE 810), will be discussed below as the occasion for each possible cross-connection arises.

The distinct elements of the computer system 118, as were previously described (such as the network control device 107, and the alarm collection and correlation device 108), will not be referred to in the following example. As mentioned, these elements as discussed above are examples of specific implementations of the present invention, and many other arrangements are possible. Notwithstanding the preceding statement, the functions provided by the various elements as described above, will be discussed in the examples below. Such functions which encompass the principles of the present invention should by now be familiar to readers of the present disclosure.

An example of an implementation of the present invention used to determine the connectivity between the DNEs 810 will now be described with reference to FIG. 8. First, a cross-connection between open port 802a and mismatched port 803a is performed within DNE 810a. Note that a mismatched signal originating from the signal mismatch generator 812a, is transmitted across the network 801 as a result of this cross-connection. Also note this first cross-connection is associated with a port (802a), which is open.

In this example, open ports are used as a starting point in order to determine network topology. Open ports are generally associated with the ends of a trunk, as previously described. The current process determines which ports within each DNE 810 are open, and which ports are cross-connected, by examining the baseline results of the audit process as described above.

Next, unsolicited alarms are collected from the network 801. For purposes of this example, suppose that in response to the preceding cross-connection, alarms are collected from ports 801*b*, 801*c* and 801*d*. The order in which these alarms are collected is irrelevant. The delay between the cross-connection and the collections of each alarm does not necessarily reveal the relative distances between the current cross-connection and the port generating the alarm. Thus, in addition to the connectivity between DNEs, the present invention also determines the order and arrangement of DNEs. For example in FIG. 8, the order of DNEs from left to right is DNE 810*a*, DNE 810*b*, DNE 810*c* and DNE 810*d*.

Next, the process determines whether the preceding alarms should be processed or ignored (i.e. whether the alarms are correlated alarms). In order to make this determination, a second cross-connection is performed. The second cross-connection should be performed at the opposite end of the trunk currently being exercised by the present invention (in this case, port 801*d*). The second end of the trunk is determined as follows.

The alarms that have been collected from ports 801*b*, 801*c* and 801*d* are examined. The baseline information that is associated with each alarm generating port is examined for an open condition. In this case, the baseline information associated with the ports 801*b*, 801*c* and 801*d* is examined. It is determined that both the ports 801*c* and 801*d* are currently cross-connected (with ports 802*b* and 802*c* respectively). Additionally, the baseline information associated with port 801*d* reveals that this port is currently open. Therefore (assuming for the moment that the alarms collected are correlated), the port 801*d* is determined to be the end of the trunk currently being exercised by the present invention.

Thus, in order to verify this topology, and to correlate the three alarms just collected, a command is sent to DNE 810*d* to cross-connect open port 801*d* with the mismatched port 803*d*. If the preceding alarms are correlated alarms, new alarms are expected to be generated by the ports 802*c*, 802*b*, and 802*a*. If these anticipated alarms are not generated, then one or more of the first three alarms collected are not correlated alarms (i.e. are not related to the first cross-connection). In this case, the first cross-connection will be repeated.

However, assuming that the first three alarms are correlated alarms, the new cross-connection generates alarms from the ports 802*c*, 802*b* and 802*a*. Thus such alarms are collected and further network topology is determined therefrom, as described below. The network topology that is determined based on the preceding two cross-connections and alarm collection and correlation is as follows. Network connectivity originates at the port 802*a* (within DNE 810*a*) and terminates at the port 801*d* (within DNE 810*d*). Further connectivity between the two terminating DNEs 810*a* and 810*d* pass through two intermediate DNEs, namely the DNE 810*b* and the DNE 810*c*.

However, at this point, the order of the two intermediate DNEs (810*b* and 810*c*) is unknown. For example, from left to right, the order of DNEs may be arranged as follows: DNE 810*a*, DNE 810*b*, DNE 810*c* and DNE 810*d*. Likewise based on the preceding information, the DNE order may also be arranged as follows: DNE 810*a*, DNE 810*c*, DNE 810*b*, and DNE 810*d*. In order to determine the actual arrangement of the two intermediate DNEs, further processing is required.

Based on the preceding information, both ends of the network capacity as well as two intermediate DNEs have been determined. Additional information is determined relating to which side of each DNE (i.e. the 'sending' or 'receiving' side), each alarm generating port is coupled with. For example, since the signal flow of the first cross-connection traveled from left to right (as depicted by FIG. 8), the ports that went into alarm state, namely ports 801*b*, 801*c* and 801*d*, must necessarily be coupled with the receiving side of their associated DNEs 810 (with respect to the signal propagation from left to right). Likewise the ports that generated alarms due to the second cross-connection must necessarily be on the opposite side of their respective DNEs 810. Thus by performing the previous two cross-connections, a mapping of the current network topology has begun.

As stated the only information needed to complete the mapping of the topology of the network 802 as depicted in FIG. 8 is the order of the two intermediate DNEs (810*c* and 810*b*). Based on the derived information above, one more cross-connection is performed to complete the map. The final cross-connection can be any one of the 2 possible cross-connections (depicted by the dotted lines in DNE 810*b* and DNE 810*c*), involving either of the two intermediate DNEs (DNE 810*b* or DNE 810*c*). Whichever DNE is chosen, the current cross-connection (either 816*b* for DNE 810*b*, or 816*c* for DNE 810*c*) is temporality disconnected so that the new cross-connection can be maintained.

For example, a random selection of port 803*b* within DNE 810 is chosen as the next cross-connection. In this case, cross-connection 816*b* is temporarily disconnected and ports 803*b* and 802*b* are cross-connected. This will generate alarms in ports 801*c* and 801*d*. Thus it is now determined that DNE 810*c* is between DNE 810*d* and DNE 810*b*. The complete topology depicted in FIG. 8 is now determined.

Likewise suppose cross-connection 816*b* is temporarily disconnected and ports 803*b* and 801*b* are cross-connected. This will generate an alarm from port 802*a*. The absence of alarm data from DNE 810*c* necessarily indicates that DNE 810*b* is adjacent to (or directly connected to), DNE 810*a*. Thus the complete topology depicted in FIG. 8 is again determined.

Further suppose cross-connection 816*c* is temporarily disconnected and ports 803*c* and 802*c* are cross-connected. This will generate an alarm from port 801*d*. The absence of alarm data from DNE 810*b* necessarily indicates that DNE 810*c* is adjacent to (or directly connected to), DNE 810*d*. Thus the complete topology depicted in FIG. 8 is again determined.

Finally, suppose cross-connection 816*c* is temporarily disconnected and ports 803*c* and 801*c* are cross-connected. This will generate alarms ports 802*b* and 802*a*. Thus it is now determined that DNE 810*b* is between DNE 810*c* and DNE 810*a*. Thus the complete topology depicted in FIG. 8 is again determined.

Variations to the above procedure should be used for problem determination. For example, suppose segment 806 is inoperative during the first cross-connection, as described above. In this case, alarms are generated by ports 801*b* and 801*c*, but no alarm is generated from port 801*d*. Thus, the procedure described above used to determine the end of the trunk would fail, since none of the alarming ports are open. In this case, another method is used to correlate the alarms. For example, the first cross-connection may be repeated one or more times to determine whether the same alarms are collected. If so, the alarms are correlated.

Next, the cross-connection within each alarm generating port is disconnected in order to exercise each port. In this manner, a mapping of the topology is determined in a similar fashion as described above. The mapping of the network 810 indicates the order and arrangement of the DNEs 810. Once the mapping is complete, it is determined that DNE 810c represents the terminating DNE for the trunk that is represented by the segment 802, the cross-connect 816b, the segment 804 and the cross-connect 816c. A lack of connectivity extending to the right (as depicted in FIG. 8), beyond the cross-connect 816c is determined, and the topology database is updated accordingly.

As shown by the previous example, there are many different variations of techniques that can be used in combination with the principles of the present invention to determine real-time current network topology. The specific techniques described in the present disclosure are merely examples of particular embodiments of the present invention. Other specific embodiments and implementations will be apparent to persons skilled in the relevant art(s).

Figure 5:
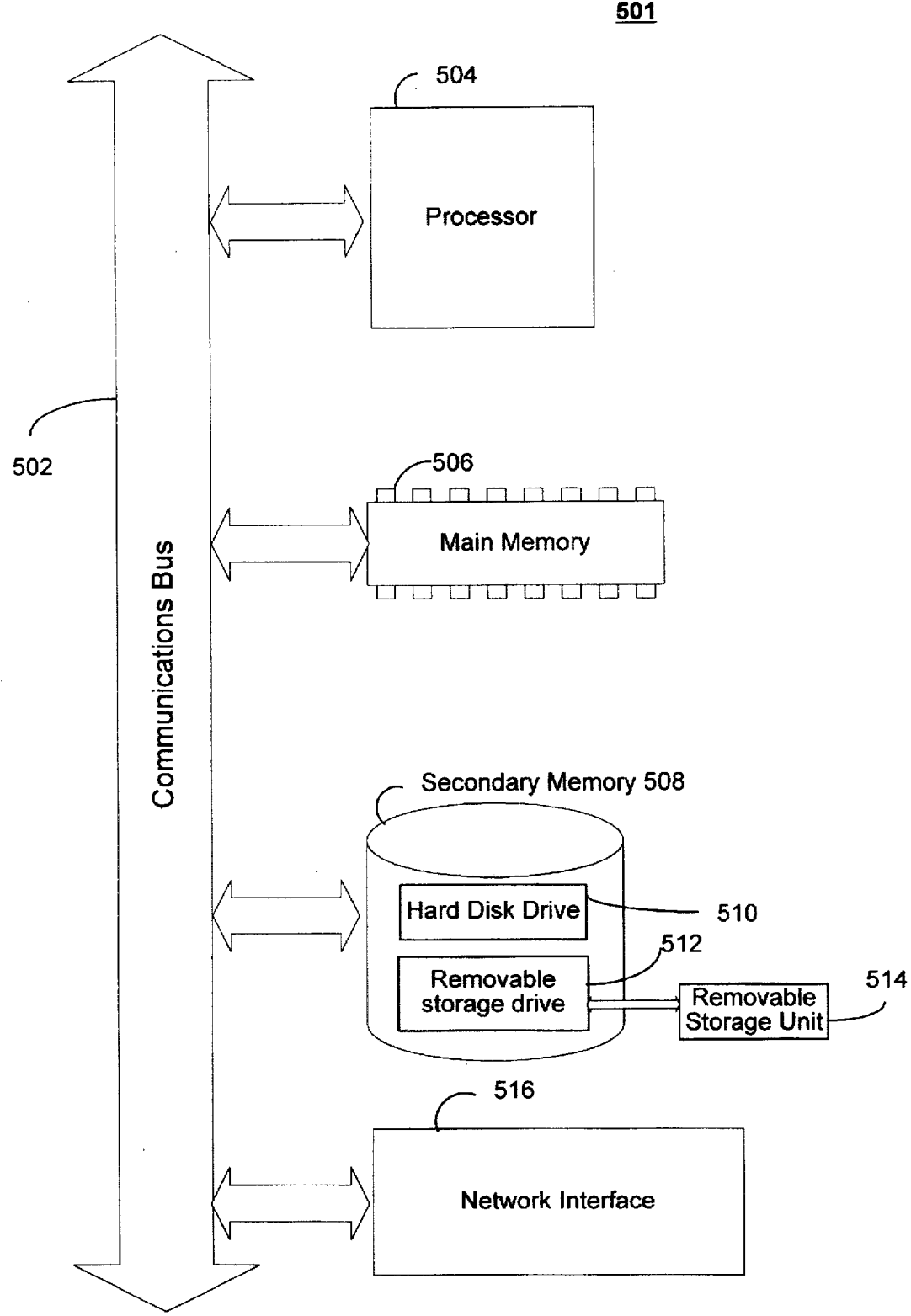
FIG. 5 is a block diagram of a computer system useful for implementing components of the present invention.

In one embodiment, the computer system 118 and the DNEs (DNE A 110, DNE B 112 and DNE C 114) may be each embodied in a general computer system. An exemplary computer system 501 is shown in FIG. 5. The computer system 501 includes one or more processors, such as processor 504. The processor 504 is connected to a communication bus 502.

The computer system 501 also includes main memory 506, preferably random access memory (RAM), and a secondary memory 508. The secondary memory 508 includes, for example, a hard disk drive 510 and/or a removable storage drive 512, representing a floppy disk drive, a magnetic tape drive, a compact disk drive, etc. The removable storage drive 512 reads from and/or writes to a removable storage unit 514 in a well known manner.

Removable storage unit 514, also called a program storage device or a computer program product, represents a floppy disk, magnetic tape, compact disk, etc. As will be appreciated, the removable storage unit 514 includes a computer usable storage medium having stored therein computer software and/or data.

The computer system 504 also includes a network interface 516 which provides for communication via the communication network 104 as discussed herein. Computer programs (also called controllers) are stored in main memory and/or the secondary memory 508. Such computer programs, when executed, enable the computer system 501 to perform the features of the present invention discussed herein. In particular, the computer programs, when executed enable the processor 504 to perform the features of the present invention. Accordingly, such computer programs represent controllers of the computer system 501.

In another embodiment, the invention is directed to a computer program product comprising a computer readable medium having control logic (computer software) stored therein. The control logic, when executed by processor 504, causes the processor 504 to perform the functions of the invention as described herein.

In another embodiment, the invention is implemented primarily in hardware. Implementation of the hardware required to perform these functions described herein will be apparent to persons skilled in the relevant art(s).

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method to dynamically determine the topology of a communications network comprising a plurality of diverse network elements (DNEs), each comprising at least one communications port, said method comprising the steps of:

(1) configuring at least one DNE with at least one mismatched port, said mismatched port adapted so that a signal mismatch is generated by each communications port coupled to said mismatched port;

(2) cross-connecting said mismatched port with a communications port within the same DNE;

(3) collecting alarm data from each communications DNE within the communications network;

(4) correlating the alarm data from step (3) with the cross-connection performed in step (2), thereby identifying alarms correlated to said mismatched port;

(5) processing the correlated alarms from step (4) to determine network connectivity.

2. The method of claim 1, wherein said configuring at least one DNE with at least one mismatched port comprises the steps of:

(a) designating at least one communications port within said DNE as said mismatched port; and (b) providing said mismatched port with a signal configuration that is different from the signal configurations provided to the communication ports within the communications network.

3. The method of claim 1, wherein said configuring at least one DNE with at least one mismatched port comprises the steps of:

(a) designating at least one communications port within said DNE as a mismatched port; and (b) coupling to said mismatched port, a signal generator adapted to generate mismatched signals.

4. The method of claim 1, wherein step (4) comprises the steps of:

(a) generating a list of anticipated alarms;

(b) comparing each alarm collected from step (3) to said list of anticipated alarms; and (c) identifying said alarm collected from step (3) as a correlated alarm if said alarm matches one of the alarms comprising said list of anticipated alarms.

5. The method of claim 1, wherein step (5) comprises the steps of:

(a) deriving the existence of connectivity between said DNE being cross-connected in step (1) and the DNE generating the correlated alarm data from step (4).

6. The method of claim 1, further comprising the step of:

(6) updating a topology database with the current network connectivity derived from step (5), and thereafter repeating at least steps (2)–(5) periodically.

7. The method of claim 1, further comprising the step of:

(6) auditing each DNE within the communications network to obtain baseline status information related to the cross-connection and alarm status of each communications port within each DNE.

8. The method of claim 7, further comprising the step of:

(7) updating a topology database with said baseline status information and thereafter repeating steps (6)-(7) periodically.

9. A system for dynamically determining the physical connection topology of a communications network comprising:

a plurality of diverse network elements (DNEs), each said DNE having a first set of communication ports and a second set of communication ports, any of said first set of communication ports being cross-connectable to any of said second set of communication ports;

a plurality of transmission segments each connecting a pair of said DNEs; and a computer system coupled to each said DNE, comprising:

audit means for obtaining baseline status information from each said DNE, said baseline status information comprising data related to the cross-connection and alarm status of each said communications port within each said DNE;

alarm generation means for generating alarms used to determine the operating condition of the transmission segments connected between the DNEs;

collection means for collecting alarm data generated by the plurality of communication ports within the communications network;

deriving means for determining the current operating condition of the transmission segments based on said audit means, said alarm generation means, and said collection means, and;

storage means for storing topology data acquired by said audit means, said alarm generation means, and said deriving means.

10. The system of claim 9, further comprising correlation means for distinguishing said alarm data caused by said alarm generation means, from general alarm data caused by other means not related to said alarm generation means.

11. The system of claim 9, wherein at least one said DNE further comprises a mismatched port adapted so that a signal mismatch is generated by each communications port coupled with said mismatched port.

12. The system of claim 11, wherein the alarm generation means further includes control means for selectively cross-connecting and disconnecting said mismatched port with other communications ports within the same DNE.

13. The system of claim 9, wherein the audit means includes a computer system in data communications with each DNE, adapted to collect said baseline information from each DNE.

14. The system of claim 11, wherein said mismatched port comprises a communications port configured to process signals that are different than the signals being processed by the communication ports within the communications network.

15. The system of claim 11, wherein said mismatched port comprises a communications port coupled with a signal generator adapted to generate mismatched signals.

16. The system of claim 10, wherein said correlation means further includes generation of a list of anticipated alarms.

17. The system of claim 16, wherein said correlation means further includes comparing means for comparing said list of anticipated alarms with said alarm data collected from said collection means, whereby a match resulting from said comparing means indicates a correlated alarm.

18. The system of claim 9, wherein said deriving means further includes deriving the existence of connectivity between the source of said alarm generation means and the source of said alarm data from said collection means.

* * * * *